US008522000B2

(12) United States Patent
Shebanow et al.

(10) Patent No.: US 8,522,000 B2
(45) Date of Patent: Aug. 27, 2013

(54) TRAP HANDLER ARCHITECTURE FOR A PARALLEL PROCESSING UNIT

(75) Inventors: Michael C. Shebanow, Saratoga, CA (US); Jack Choquette, Palo Alto, CA (US); Brett W. Coon, San Jose, CA (US); Steven J. Heinrich, Madison, AL (US); Aravind Kalaiah, Los Gatos, CA (US); John R. Nickolls, Los Altos, CA (US); Daniel Salinas, San Francisco, CA (US); Ming Y. Siu, Santa Clara, CA (US); Tommy Thorn, Milpitas, CA (US); Nicholas Wang, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 915 days.

(21) Appl. No.: 12/569,831

(22) Filed: Sep. 29, 2009

(65) Prior Publication Data

US 2011/0078427 A1    Mar. 31, 2011

(51) Int. Cl.
*G06F 9/00* (2006.01)
(52) U.S. Cl.
USPC .......................................... 712/244; 712/225
(58) Field of Classification Search
None
See application file for complete search history.

(56) References Cited

U.S. PATENT DOCUMENTS

| 2004/0244000 | A1 | 12/2004 | Frank et al. |
| 2005/0010743 | A1 | 1/2005 | Tremblay et al. |
| 2005/0246688 | A1* | 11/2005 | Gupta et al. ................. 717/124 |
| 2006/0117316 | A1 | 6/2006 | Cismas et al. |
| 2007/0043531 | A1 | 2/2007 | Kosche et al. |
| 2007/0180322 | A1* | 8/2007 | Todoroki et al. ................ 714/34 |

FOREIGN PATENT DOCUMENTS

| WO | 2008127610 | 10/2008 |
| WO | 2008127622 | 10/2008 |
| WO | 2008127623 | 10/2008 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.
International Search Report, PCT Appl. No. PCT/US 10/50592, mailed Dec. 16, 2010.

* cited by examiner

*Primary Examiner* — Andrew Caldwell
*Assistant Examiner* — Benjamin Geib
(74) *Attorney, Agent, or Firm* — Patterson & Sheridan, L.L.P.

(57) ABSTRACT

A trap handler architecture is incorporated into a parallel processing subsystem such as a GPU. The trap handler architecture minimizes design complexity and verification efforts for concurrently executing threads by imposing a property that all thread groups associated with a streaming multi-processor are either all executing within their respective code segments or are all executing within the trap handler code segment.

20 Claims, 9 Drawing Sheets

TRAP HANDLER ARCHITECTURE FOR A PARALLEL PROCESSING UNIT

BACKGROUND OF THE INVENTION

1. Field of the Invention

The present invention generally relates to trap handlers architectures and more specifically to trap handler architectures in highly parallel thread processors and graphics processing units.

2. Description of the Related Art

Trap handlers are software routines in a computer system that are executed, for example, when an exception or interrupt occurs in the computer system during execution of a computer program. Exceptions occur as a result of executing a certain instruction in the computer program that causes an unexpected result that needs to be handled in a specific way. For example, an instruction to divide by zero or an instruction containing a bad memory address would generate an exception causing the flow of the computer program to jump into a trap handler routine. In contrast, interrupts occur due to external events that are not dependent upon the flow of computer program itself. For example, device I/O events such as a button press on a mouse or the completion of a data transfer to a NIC card will cause the device to transmit an interrupt to the computer system, similarly causing the flow of the computer program to jump into a trap handler routine. Whether dealing with exceptions or interrupts (collectively referred to herein as "exceptions"), a trap handler architecture typically begins by saving the state of the current computer program flow (e.g., onto the program stack) and then jumping into a particular subroutine in the trap handler to address the particular exception or interrupt.

Although trap handler architectures are commonly implemented in operating systems and device drivers of computer systems, to date, highly parallel thread processors such as graphics processing subsystems or GPUs (graphics processing units) in such computer systems have not incorporated trap handler architectures due difficulties in implementation and efficiency. Due to their highly parallelized nature, a trap handler architecture for a modern GPU needs to properly deal with tens of thousands of concurrently executing threads corresponding to multiple different thread groups that may be running within the GPU upon the occurrence of an interrupt or exception. Furthermore, integrated circuit components of such a trap handler architecture need to utilize semiconductor wafer die area efficiently given the size and cost constraints for GPUs. Due to the difficulties of incorporating a trap handler architecture that can efficiently deal with concurrently executing threads, current GPUs are not able to provide enhanced feature sets that are dependent on trap handlers, such as handling host CPU interrupts, exception handling directly within the GPU without interacting with the CPU, and GPU system call support.

Accordingly, what is needed in the art is a system and method for efficiently providing a trap handler architecture within an GPU that is able to properly handle the highly parallelized nature of currently running threads within the GPU.

SUMMARY OF THE INVENTION

One or more embodiments of the invention provide a trap handler architecture for a GPU that handles exceptions and interrupts within the GPU. In order to address thread group synchronization issues and minimize design complexity and verification efforts for each of the thread groups of the GPU, the trap handler architecture enforces a property that all thread groups are either all executing within their respective code segments or are all executing within the code segment of a trap handler code segment.

According to one embodiment, a GPU is configured to handle a disruption event, such as an exception or an interrupt, occurring during execution of a first thread group within a multiprocessor of the GPU. The GPU comprises a trap handler controller configured to perform the steps of receiving notification of the disruption event, halting execution of all thread groups executing within the multiprocessor, setting an error status register to indicate a type of the disruption event, and setting, for each thread group, a program counter to point to a memory address of a trap handler code segment that comprises a software routine that configured the multiprocessor to handle the disruption event; and a memory unit comprising the trap handler code segment including instructions, that when executed by the multiprocessor, performs the steps of requesting a value of the error status register, branching to a sub-segment in the trap handler code segment that comprises instructions for addressing the type of disruption event, and executing instructions in the sub-segment of the trap handler code segment to handle the disruption event.

One advantage of a GPU that includes such a trap handler architecture is that the GPU less dependent on the host CPU when dealing with a number of situations that can be internally handled by the trap handler itself.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
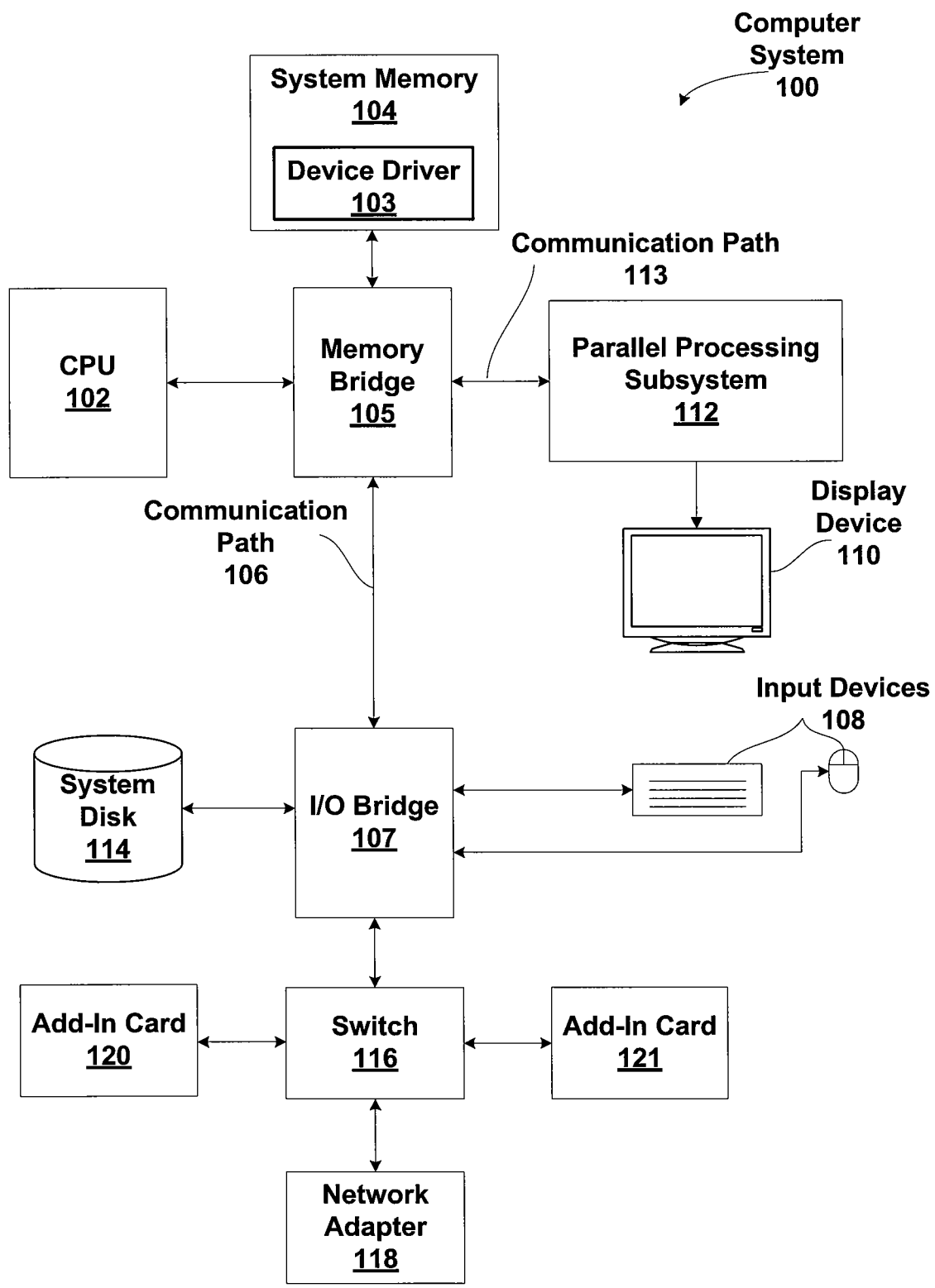
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
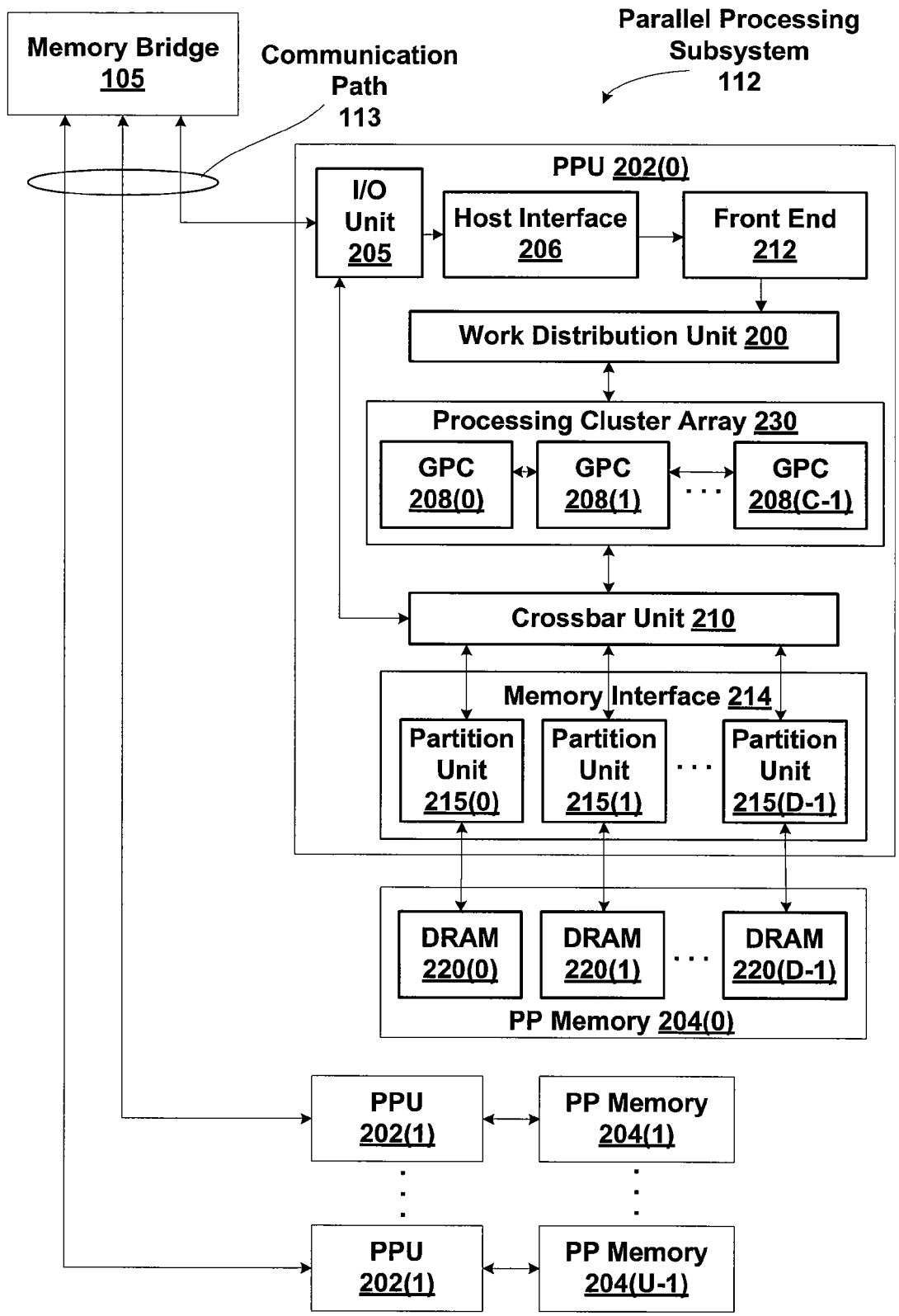
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
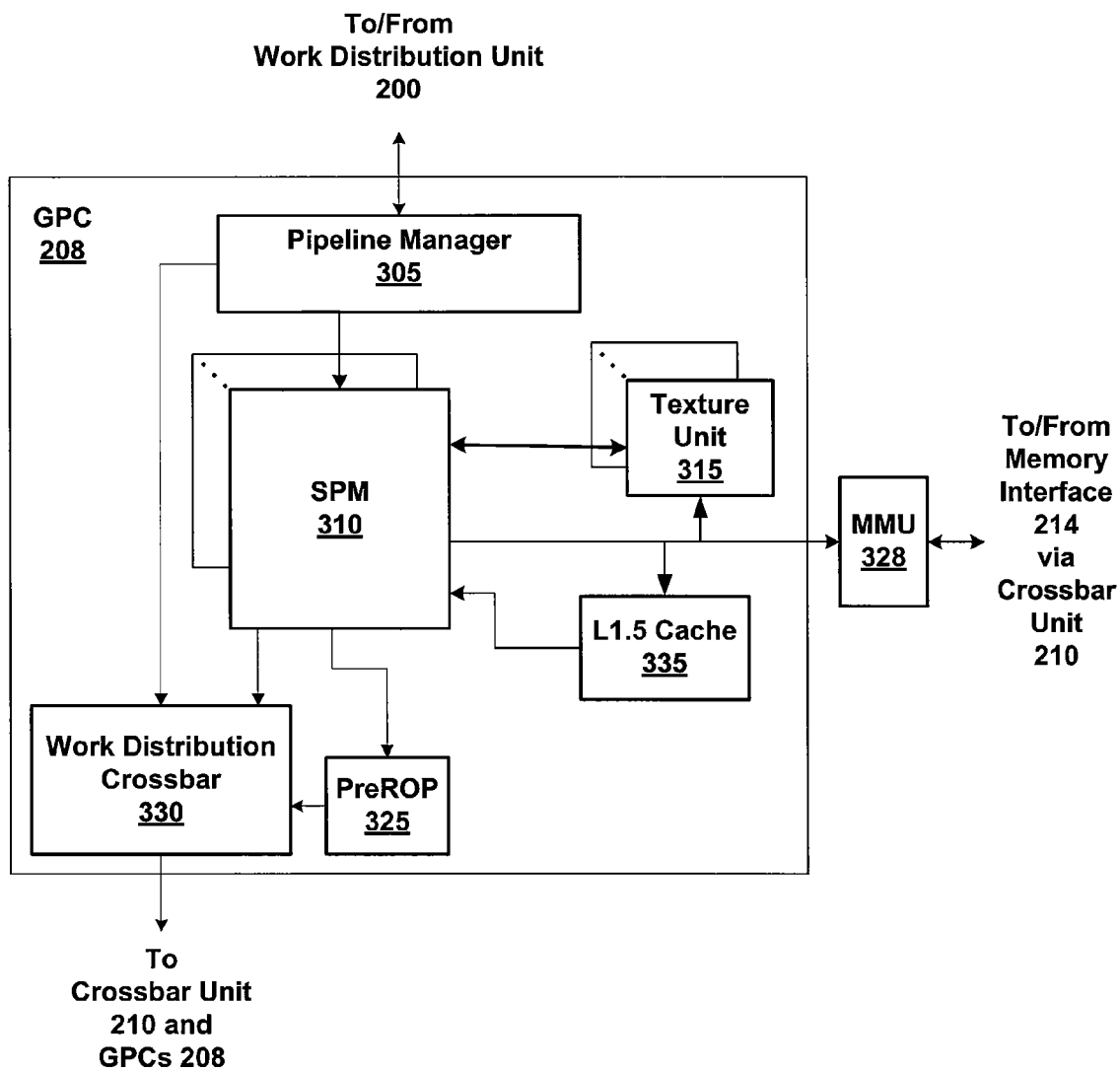
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
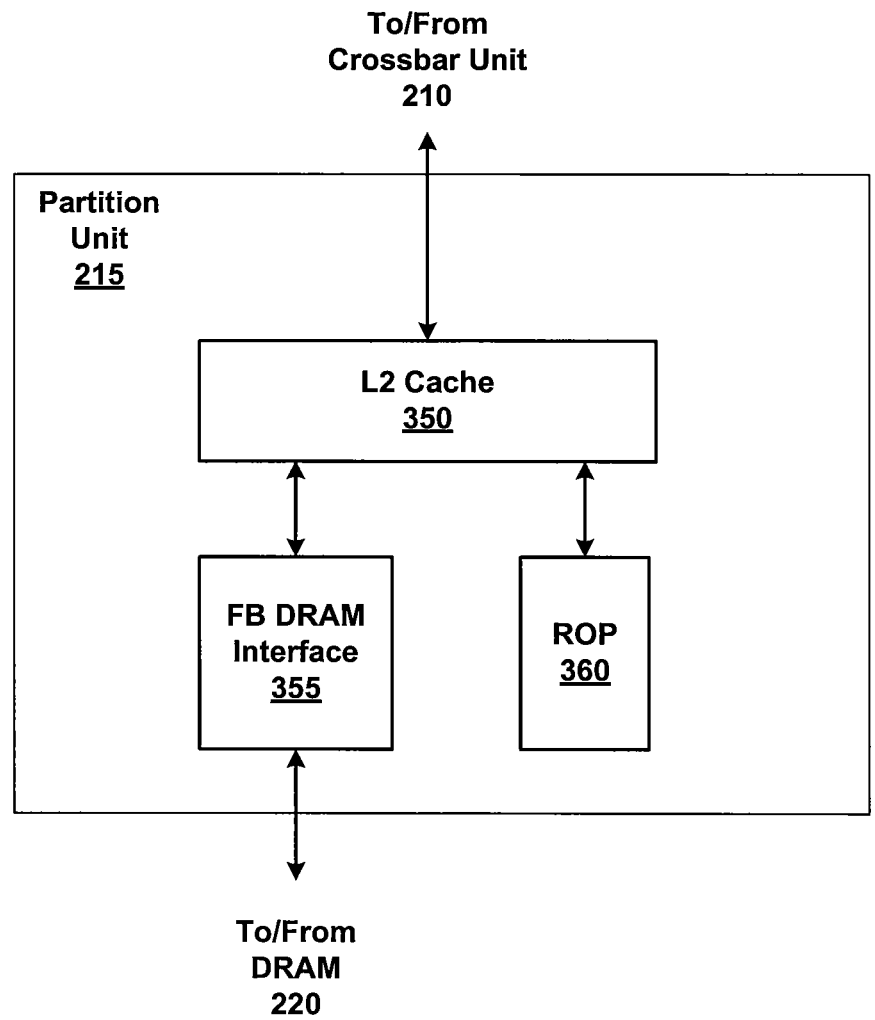
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
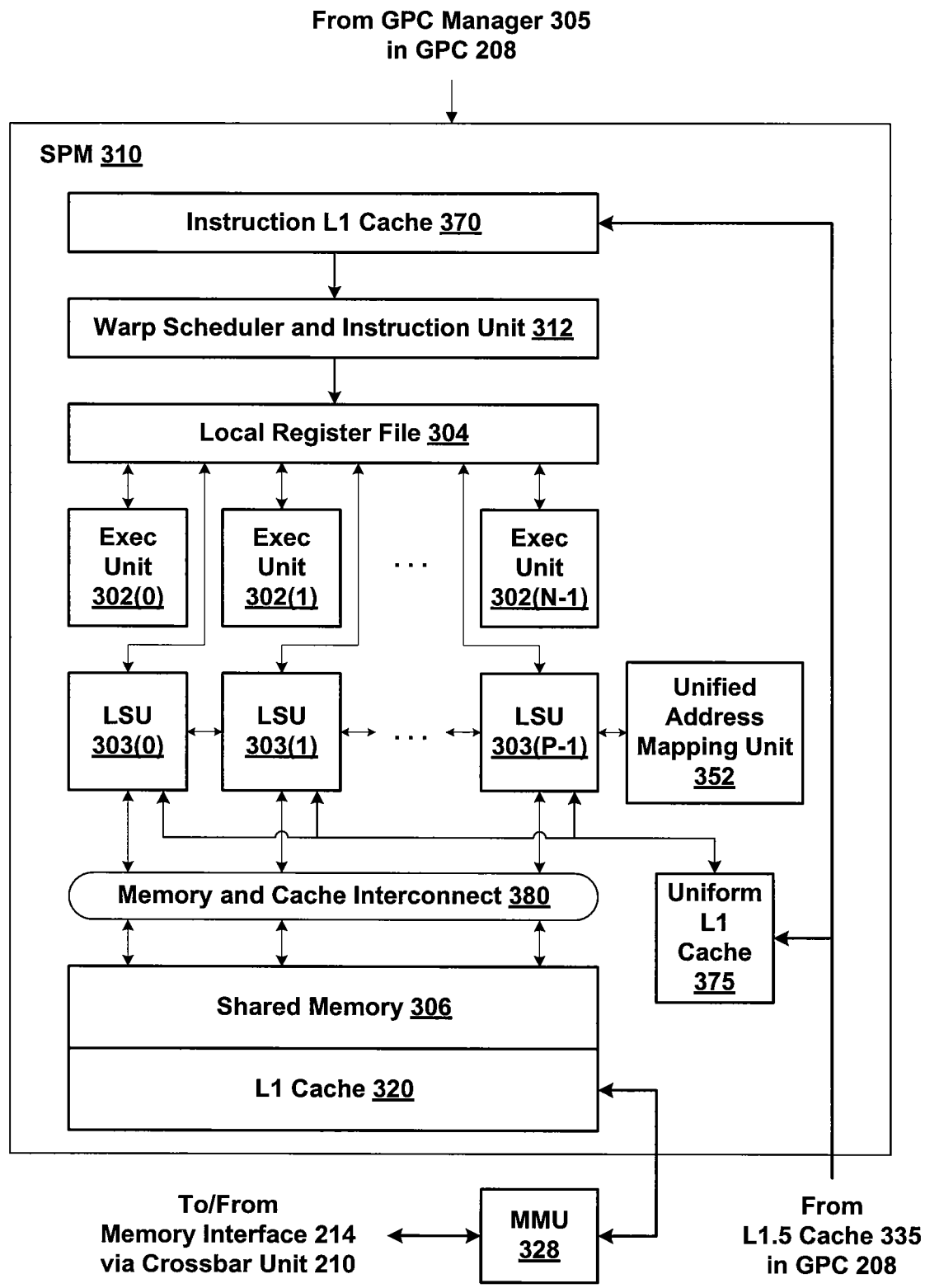
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
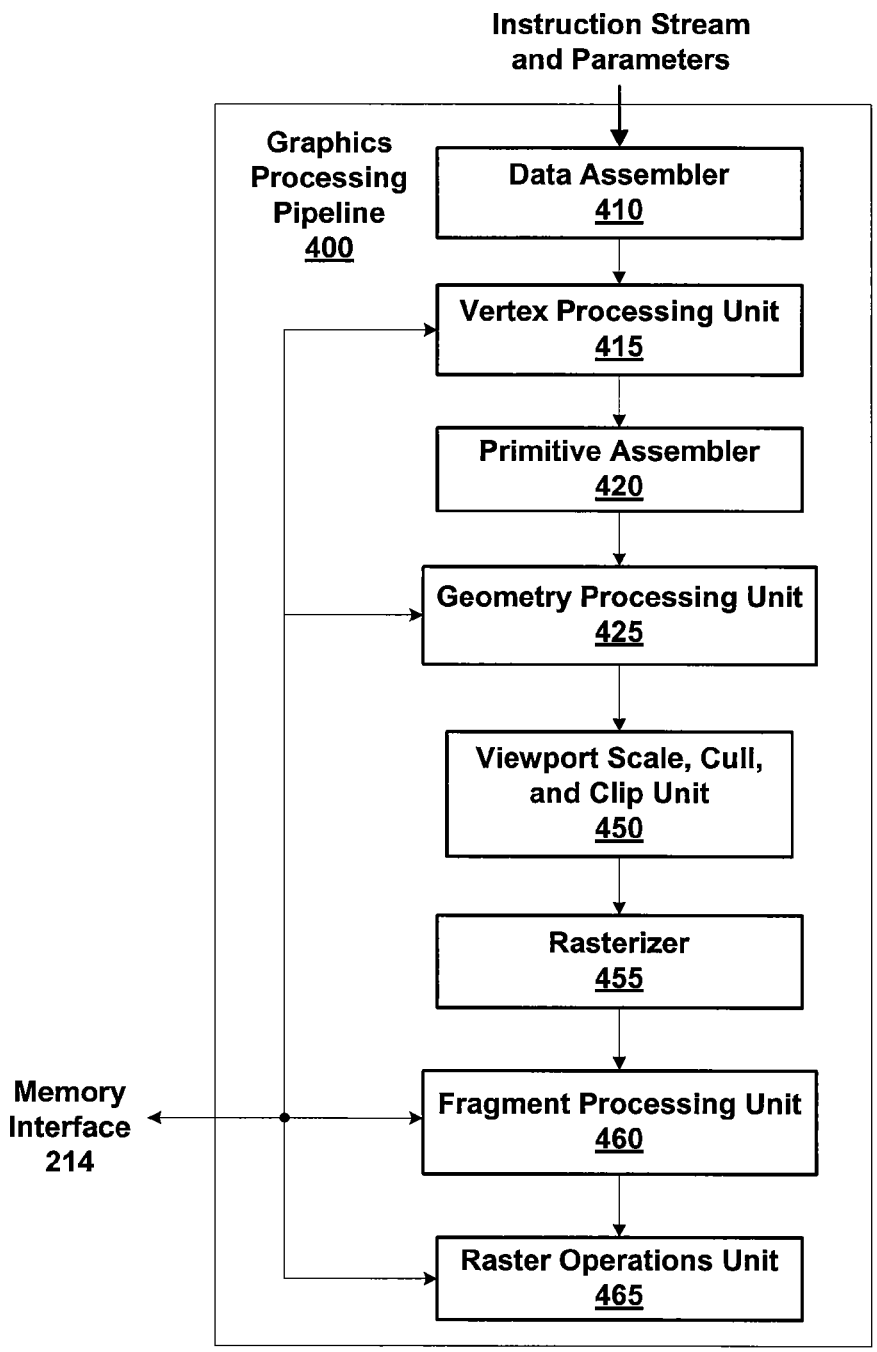
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Trap Handler Architecture

Figure 5:
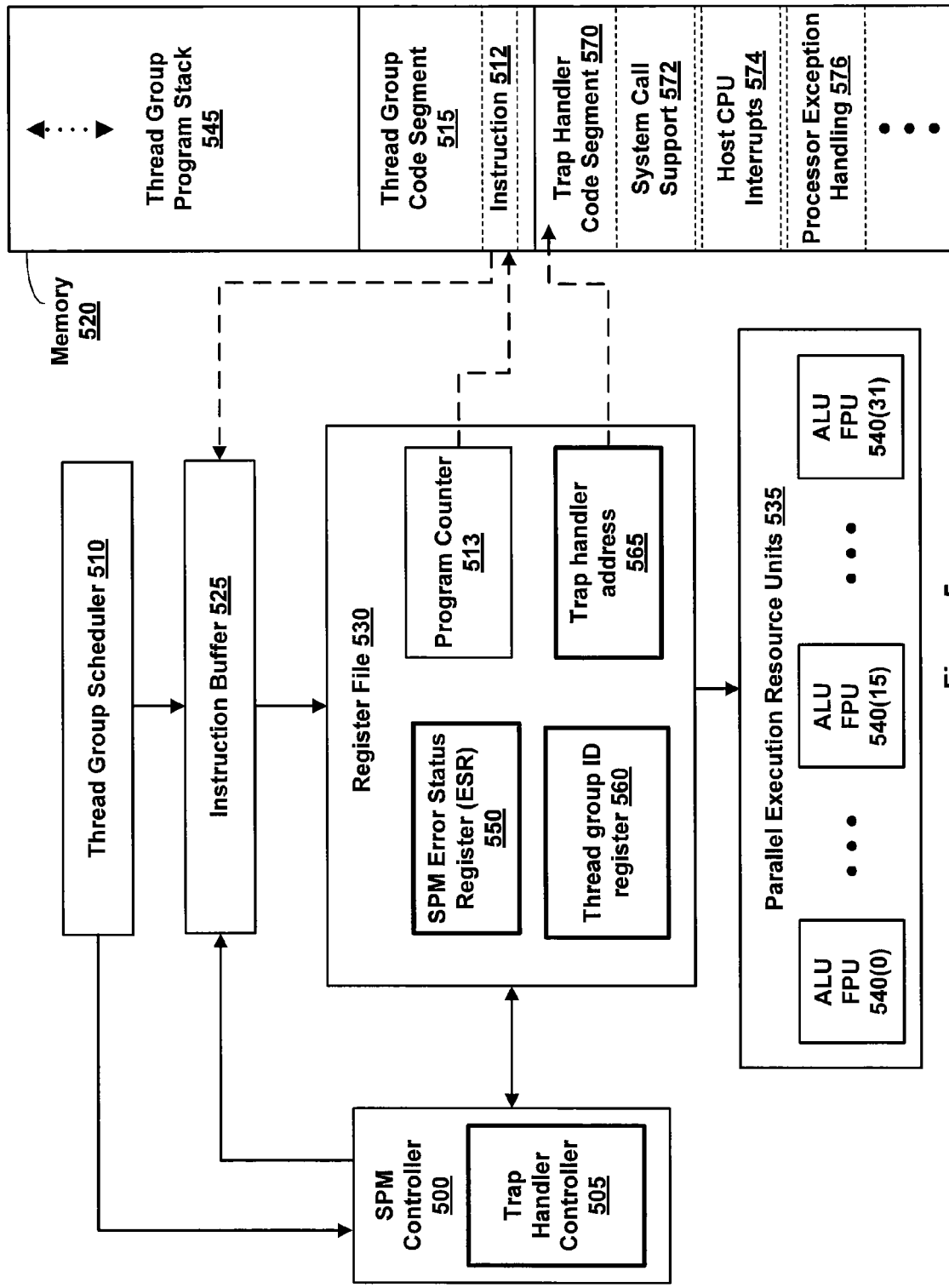
FIG. 5 is a block diagram of an SPM architecture that includes a trap handler controller, according to one embodiment of the present invention.

FIG. 5 is a block diagram of an SPM architecture that includes a trap handler controller, according to one embodiment of the present invention. Persons skilled in the art will recognize that only components generally relevant to the implementation of trap handler functionality are depicted in FIG. 5, that FIG. 5 is a simplified block diagram of an SPM architecture and that not all logical components of an SPM architecture are necessarily depicted therein (e.g., pre-fetch instruction buffers, caches, shared memory, etc.). For example, it should be recognized that FIG. 5 may be considered a simplified version or alternative embodiment of FIG. 3C that includes less detail than the embodiment of FIG. 3C and that the various components in FIG. 5 and FIG. 3C may be incorporated and combined consistently in an actual SPM architecture.

As depicted in the embodiment of FIG. 5, SPM controller 500 of SPM 310 of FIG. 3A includes integrated circuit logic for the fetch-decode-execute cycle of SPM 310 when executing computer program instructions for a particular thread group at a particular point in time. SPM controller 500 also comprises a trap handler controller 505 that includes integrated circuit logic to handle interrupts and exceptions that occur during the flow of the computer program. SPM controller 500 communicates with thread group scheduler 510 to determine which of several thread groups at a particular point in time is allocated the computing resources of SPM 310 (e.g., SPM controller 500 time slices the computing resources of SPM 310 among its various supported thread groups in accordance with any priorities set by thread group scheduler 510). When a particular thread group has access to SPM 310 resources as determined by thread group scheduler 510, the computer program instruction 512 pointed to by program counter 513 is fetched from the code segment 515 (i.e., for the particular computer program being executed by the thread group) of memory 520 (e.g., parallel processing memory 204 in certain embodiments, etc.) and brought into instruction buffer 525 of SPM 310 for decoding and execution (and program counter 513 is subsequently incremented). As previously discussed, each thread in a particular thread group simultaneously executes the instruction in instruction buffer 525, each utilizing any necessary registers available in register file 530 and each being assigned one of the ALU/FPU (Arithmetic Logic Units/Floating Point Unit) computation units 540(x) of parallel execution resource unit 535 to perform the necessary computations associated with the instruction. For example, as depicted in the embodiment of FIG. 5, SPM 310 can support up to 32 different simultaneously executing threads in a thread group because parallel execution resource unit 535 includes 32 separate computation units 540(x). As should be recognized by persons skilled in the art, thread group program stack 545 of memory 520 is allocated to the computer program being executed by a thread group in order to store state information (e.g., local variables, temporary information, etc.) during the execution of the computer program and accordingly grows and shrinks as needed during the execution flow of the computer program.

Register file 530 further includes special registers utilized by trap handler controller 505 upon the occurrence of an exception or interrupt. Register file 530 includes an error status register (ESR) 550 that is utilized by trap handler controller 505 to indicate the type of exception or interrupt that occurred. In certain embodiments, ESR 550 is the only ESR register of SPM 310 and is shared among all the thread groups (as further described below). Thread group ID register 560 is utilized by trap handler controller 505 to store the identification number of the thread group causing or otherwise associated with the interrupt or exception. And trap handler address register 565 comprises the memory address of trap handler code segment 570 in memory 520. Trap handler code segment 570 is further divided into sub-segments of code that each include instructions to handle different types of exceptions or interrupts. For example, as depicted, trap handler code segments includes code sub-segment 572 to support the handling of certain system calls (e.g., malloc ( ) to allocate additional GPU memory for a computer program running within SPM 310, etc.) within the GPU, code sub-segment 574 to handle host CPU interrupts, for example, for debugging purposes, and code sub-segment 576 to handle processor exceptions during the execution flow of a computer program (e.g., bad memory address, etc.). It should be recognized that any number of additional or alternative code sub-segments to handle any variety of exception or interrupt scenarios may be included in trap handler code segment 570 consistent with the teachings herein. Such additional exception or interrupt scenarios may include, for example, handling intra-SPM exceptions, context switching of GPU workloads, error correction code (ECC) error handling and time out conditions.

Figure 6:
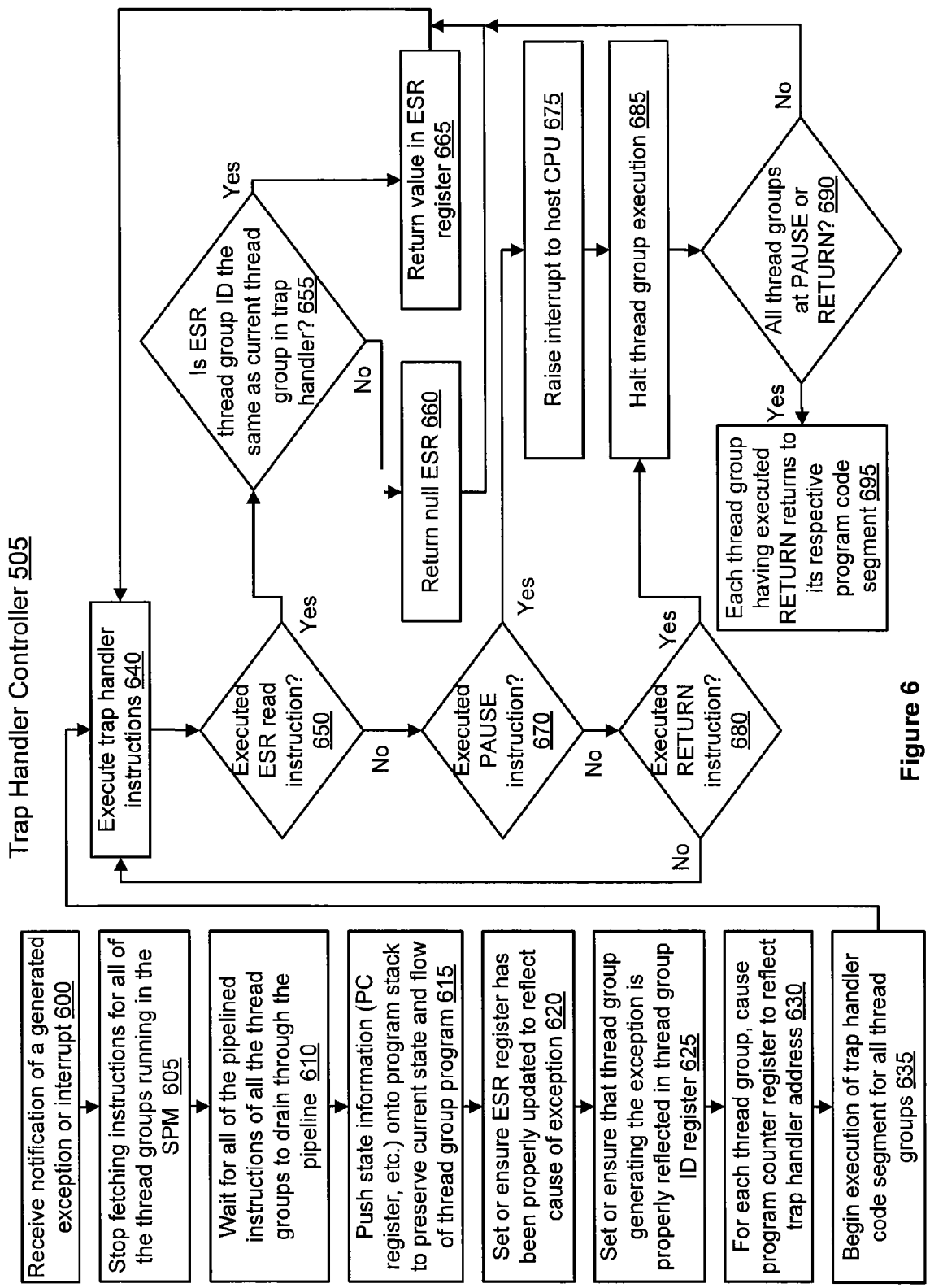
FIG. 6 is a flow diagram of method steps for the handling an exception or interrupt by a trap handler controller, according to one embodiment of the present invention.

FIG. 6 is a flow diagram of method steps for handling an exception or interrupt by a trap handler controller, according to one embodiment of the present invention. Although the method steps are described in conjunction with FIGS. 1 to 5, persons skilled in the art will understand that any system configured to perform the method steps, in any order, falls within the scope of the present invention.

In order to minimize design complexity and verification efforts for each of its thread groups, an SPM that follows the flow of FIG. 6 for handling an exception or interrupt enforces the property that all of its thread groups are either all executing within their respective code segments 515 or are all executing within trap handler code segment 570. In step 600, trap handler controller 505 is notified that a particular thread of a currently executing thread group has encountered an exception (or an interrupt occurs, as the case may be), for example, due to accessing a bad memory address during computation within one of ALU/FPU computation units 540 (x). In step 605, upon being notified of the exception, trap handler controller 505 stops fetching instructions for all thread groups of SPM 310 and in step 610, waits for all currently pipelined instructions in each of the thread groups to drain or otherwise complete. In step 615, trap handler controller 505 pushes certain state information relating to each thread group's program execution state (e.g., current program counter 513 value, address of code segment 515, other status registers, etc.) onto each respective thread group's program stack 545 to preserve the thread group's state of execution. In step 620, trap handler controller 505 sets or otherwise ensures that ESR 550 has been properly updated to reflect the cause of the exception and in step 625, sets or otherwise ensures that the identification of the thread group generating the exception is properly reflected in thread group ID register 560. In step 630, for each thread group, trap handler controller 505 causes program counter 513 to contain the address found in trap handler address 565 thereby causing each of the thread groups to subsequently enter trap handler code segment 570 in step 635

Each thread group initially encounters an instruction to read the ESR register in step 650 when it enters trap code handler code segment 570. When handling this ESR read instruction, trap handler controller 505 determines in step 655 whether the thread group ID of the current thread group executing the ESR read instruction is the same as the thread ID that was set in thread group ID register 560 in step 625. If the thread groups are different, trap handler controller 505 returns a null or clear ESR value in step 660 indicating that the current thread group did not encounter the exception or interrupt and can therefore exit or otherwise return out of the trap handler code segment 570 (as further described in FIG. 7). If the thread groups match, then, in step 665, trap handler controller returns the ESR value stored in ESR register 550 in step 620.

As further depicted in FIG. 6, during execution of trap handler code segment 570, each thread group, depending upon the type of exception or interrupt that occurred, may encounter either a PAUSE instruction or a RETURN instruction (or the equivalent instructions thereof) as shown in steps 670 and 680, respectively. Certain types of exceptions or interrupts, for example, may ultimately require communication with the host CPU to handle. For example, as a result of a user attaching a debugger to the execution flow of the program (e.g., using a "cntrl-c" command in a debugging session to halt and inspect program execution state), a host CPU may transmit an interrupt into the GPU resulting in a corresponding thread group reaching sub-segment code 574 of trap handler code segment 570 in order to handle host CPU interrupts. The sub-segment code may include instructions to obtain and store certain state information (e.g., useful for debugging purposes) associated with the thread group and include a PAUSE instruction that yields control back to the host CPU by transmitting an interrupt back to the host CPU to inform it that state information is ready to be consumed, as in step 675. Once the interrupt is raised to the host CPU in step 675, the trap handler controller halts the thread group's execution in step 685. Thread groups which executed PAUSE remain in halted state until the host CPU explicitly commands them to resume execution.

Alternatively, the executing sub-segment code of trap handler code segment 570 may contain instructions that enable SPM 310 to handle the exception or interrupt without resorting to communication with the host CPU. In such cases, the sub-segment code will ultimately include a RETURN instruction (after any other instructions for handling the exception or interrupt), which similarly, causes trap handler controller 505 to halt the thread group's execution in step 685. Once all thread groups of SPM 310 have either executed a RETURN or PAUSE instruction, as determined in step 690, then in step 695, trap handler controller 505 allows the thread groups which executed RETURN to return to their respective code segments 515.

Figure 7:
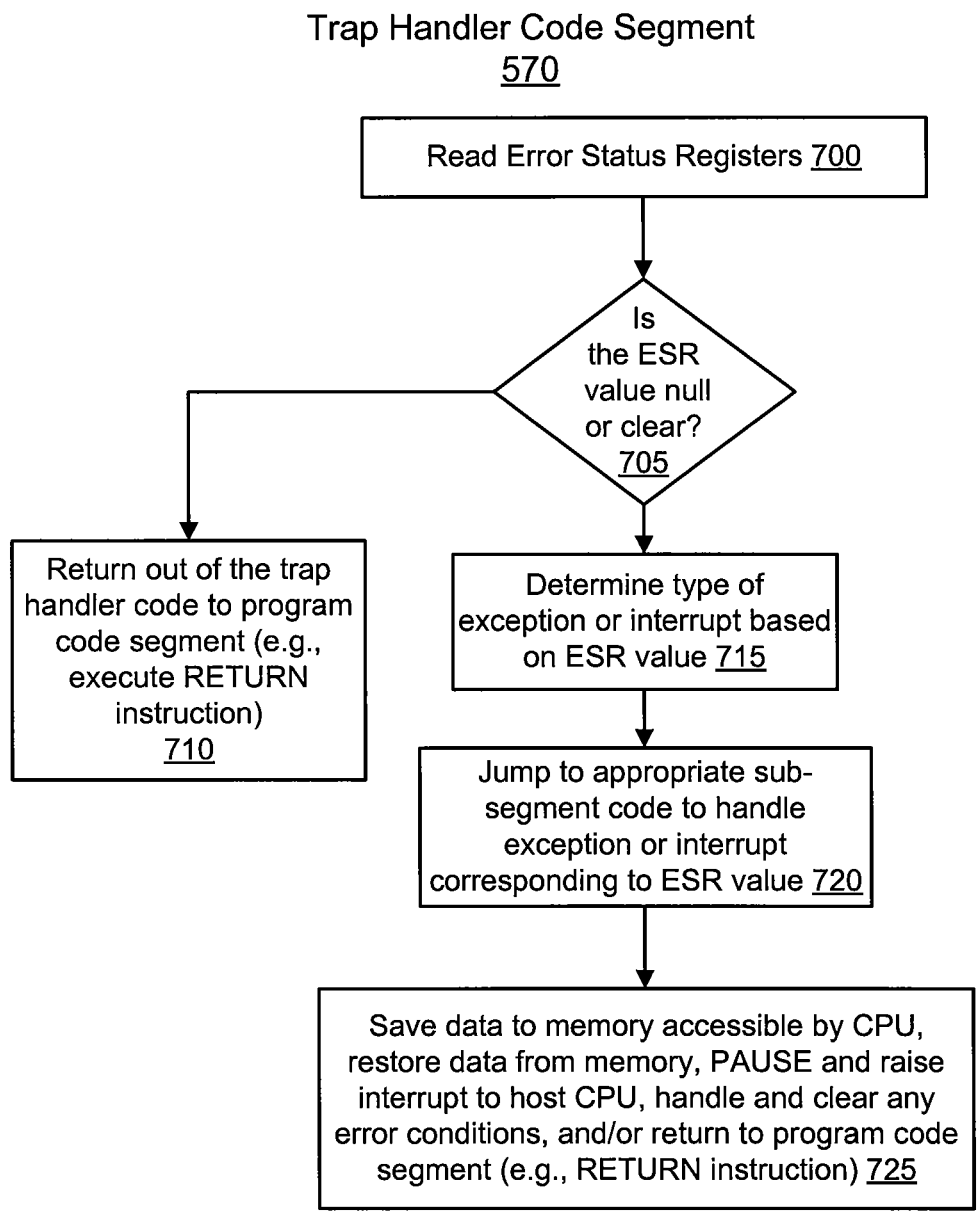
FIG. 7 is a flow diagram of a trap handler code segment, according to one embodiment of the present invention.

FIG. 7 is a flow diagram of a trap handler code segment, according to one embodiment of the present invention. Although the flow of the trap handler code segment is described in conjunction with FIGS. 1 to 5, persons skilled in the art will understand that any system configured to perform the steps, in any order, falls within the scope of the present invention. It should be recognized that the FIG. 7 is a more detailed description step 640 in FIG. 6.

As previously discussed in the context of FIG. 6, each thread group running trap handler code segment 570 initially reads its ESR register in step 700. In one embodiment, trap handler controller 505 gives the appearance that each thread group has its own dedicated ESR registers although it may be using a single ESR register 550 and the logic described in steps 655-665 of FIG. 6 to effectuate such an appearance. If, in step 705, the return value of the read instruction is null or clear (indicating that the current thread group did not experience an actual exception or interrupt), then in step 710, trap handler code segment 570 may include a RETURN instruction that returns the thread group to its code segment 515. If, however, the ESR read instruction returns a value, then in step 715, the type of exception or interrupt is determined based on the returned value, and in step 720, execution flow branches or jumps to the appropriate sub-segment code of trap handler code segment 570. As described in step 725, the sub-segment code may include a variety of instructions to handle the exception or interrupt, for example, saving data to memory accessible by CPU, restoring data from memory, executing a PAUSE and raising an interrupt to host CPU, handling and clearing any error conditions, and/or returning to program code segment (e.g., RETURN instruction).

While the foregoing is directed to embodiments of the present invention, other and further embodiments of the invention may be devised without departing from the basic scope thereof. For example, certain embodiments of GPUs as described herein provide the capability to avoid deadlocks among concurrently executing thread groups of an SPM that are executing the same program block. For example, such simultaneously executing thread groups may block each other from manipulating the same global variables in shared memory or otherwise cause data corruption to such global variables due to out-of-order execution. As such, instructions (referred to as barriers or syncthreads ( )) are exposed to developers to enable them to partition their code into sections to enforce an ordering constraint on shared memory operations across the simultaneously executing threads groups. Such barriers ensure that all shared memory references occurring prior to a synchronization barrier instruction are completed before any shared memory references after the synchronization barrier. An SPM encountering a synchronization barrier instruction in a thread group will stop fetching instructions for the thread group and wait for all other related thread groups to reach their corresponding synchronization barrier instruction prior to continuing execution of all the thread groups. However, if one (possibly unrelated) thread group of the SPM encounters an exception, thread groups that are waiting on a synchronization barrier instruction may never complete the synchronization barrier instruction in order to continue its execution flow (i.e., even to the trap handler code segment) because other thread groups that they may have been waiting for may never reach their corresponding synchronization barrier instruction prior reaching to step 605 as a result of the encountered exception. As such, in order to prevent the foregoing situation (i.e., where certain thread groups are indefinitely halted at a synchronization barrier instruction and cannot proceed into the trap handler code segment), an alternative embodiment to the flow of FIG. 6 first recognizes whether a thread group is waiting on a synchronization barrier instruction after step 610 and unwinds or otherwise rolls back the synchronization barrier instruction prior to step 615 so that such thread group will be able to freely enter into trap handler code segment in step 635 (i.e., it will not be still waiting on the synchronization barrier instruction, but will have rather completed a previous instruction so that it can move into the trap handler code segment).

Alternative embodiments may include additional features. For example, one alternative embodiment may enable the occurrence of an interrupt to be broadcast to all other SMs on the GPU so that the other SPM can optionally trap if desired. Trapping all thread groups across SMs or across the GPU is often useful since thread groups are typically closely coupled in GPU style parallel computing. Another alternative embodiment may utilize an additional global ESR that notifies all SMs in a GPU of an interrupt, in addition to ESR 550 of each SPM. Certain interrupts, such as external host CPU interrupts, may be classified as a global interrupt and therefore utilize the global ESR in order to trigger notification to all SMs in the GPU. In such an embodiment, both ESRs may need to return a null or clear value before the flow of the trap handler code segment enables a thread group to return to the thread group's code segment as in step 710 of FIG. 7. Other embodiments of a trap handler architecture as described herein may include additional features such as the ability to disable certain exceptions while executing within the trap handler, a vector table to support efficient and arbitrary code insertion, dynamic binding of the trap handler and vector table, and a hardware implementation of a debugger "single step" mode. For example, when such a debugger single step mode is enabled, the SPM fetches and executes a single instruction from each eligible thread group before trapping all eligible thread groups. Such an implementation yields a more efficient single step implementation since the debugger software need not repeatedly insert and subsequently replace breakpoint instructions at each step. Other alternative embodiments may disable out-of-range register exceptions while executing within the trap handler, thereby allowing different concurrently running processes to allocate varying numbers of local per-thread registers, yet share the same trap handler. Disabling out-of-range register exceptions within the trap handler allows the trap handler to read all architecturally accessible registers without needing to identify the actual number of allocated registers. Yet another alternative embodiment may include a vector table targeted by a specific branch instruction. The vector table base address is dynamically bound via an externally visible memory-mapped register which allows an arbitrary vector table to be constructed after a process has already begun execution. The vector table and branch instruction enable efficient insertion of arbitrary instruction sequences, for example, for the evaluation of trap conditions (e.g., conditional breakpoints). The branch instructions acts as a function call as a subsequent function return instruction returns the control flow of the process to the instruction following the branch instruction. Like the branch instruction vector table, the memory address of the trap handler itself may also be bound dynamically via the memory-mapped register, enabling a debugger to dynamically attach to a running process on the GPU. Furthermore, it should be recognized that the contents of the trap handler code segment in certain embodiments is programmable and can be dynamically updated, for example, through firmware upgrades and the like.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for handling a disruption event occurring during execution of a first thread group within a multiprocessor of a parallel processing subsystem residing within a computer system, the method comprising:
   receiving notification of the disruption event;
   identifying a second thread group that is waiting for at least one other thread group at a synchronization barrier instruction;
   unwinding execution of the synchronization barrier instruction by the second thread group, such that the second thread group is no longer waiting for the at least one other thread group at the synchronization barrier instruction, to facilitate entrance into the trap handler code segment for the second thread group;
   halting execution of all thread groups executing within the multiprocessor;
   setting an error status register to indicate a type of the disruption event; and
   setting, for each thread group, a program counter to point to a memory address of a trap handler code segment that comprises a software routine that configures the multiprocessor to handle the disruption event.

2. The method of claim 1, wherein the step of halting execution of all thread groups comprises waiting for all instructions pipelined for execution by all thread groups executing within the multiprocessor to complete.

3. The method of claim 1, wherein the step of halting execution of all thread groups comprises maintaining sufficient state of the multiprocessor during execution in order to roll back all instructions pipelined for execution.

4. The method of claim 1, wherein the disruption event is selected from the group consisting of exceptions generated by a first thread of the thread group and interrupts generated externally from the execution of the first thread group.

5. The method of claim 1, wherein the threads associated with each thread group executing within the multiprocessor concurrently execute, and the thread groups are allocated time slices in the multiprocessor.

6. The method of claim 1, further comprising the steps of:
   determining that the first thread group is executing in the trap handler code segment;
   providing a value in the error status register in response to an instruction in the trap handler code segment for reading the error status register; and
   executing instructions in a sub-segment of the trap handler code segment to handle the disruption event.

7. The method of claim 6, further comprising the steps of:
   waiting for each of the other thread groups executing in the multiprocessor to either complete execution within the trap handler code or yield execution flow to a host CPU residing within the computer system; and
   returning to a code segment of the first thread group prior to encountering the disruption event.

8. The method of claim 6, wherein the step of executing instructions in the sub-segment of the trap handler code segment includes executing an instruction to transmit an interrupt to a host CPU residing within the computer system to notify the host CPU of the disruption event.

9. A graphics processing unit (GPU) configured to handle a disruption event occurring during execution of a first thread group within a multiprocessor of the GPU, the GPU comprising:
   a trap handler controller configured to perform the steps of:
      receiving notification of the disruption event;
      identifying a second thread group that is waiting for at least one other thread group at a synchronization barrier instruction;
      unwinding execution of the synchronization barrier instruction by the second thread group, such that the second thread group is no longer waiting for the at least one other thread group at the synchronization barrier instruction, to facilitate entrance into the trap handler code segment for the second thread group;
      halting execution of all thread groups executing within the multiprocessor;
      setting an error status register to indicate a type of the disruption event; and
      setting, for each thread group, a program counter to point to a memory address of a trap handler code segment that comprises a software routine that configures the multiprocessor to handle the disruption event; and
   a memory unit comprising the trap handler code segment including instructions, that when executed by the multiprocessor, performs the steps of:
      requesting a value of the error status register;

branching to a sub-segment in the trap handler code segment that comprises instructions for addressing the type of disruption event; and executing instructions in the sub-segment of the trap handler code segment to handle the disruption event.

10. The GPU of claim 9, wherein the trap handler controller is further configured to perform the steps of determining that the first thread group is executing in the trap handler code segment, providing a value in the error status register in response to an instruction in the trap handler code segment for reading the error status register, and executing instructions in a sub-segment of the trap handler code segment to handle the disruption event.

11. The GPU of claim 9, wherein the step of executing instructions in the sub-segment of the trap handler code segment includes executing an instruction to transmit an interrupt to a host CPU residing within the computer system to notify the host CPU of the disruption event.

12. The GPU of claim 9, wherein the trap handler controller is further configured to perform the steps of waiting for each of the other thread groups executing in the multiprocessor to either complete execution within the trap handler code or yield execution flow to a host CPU residing within the computer system, and returning to a code segment of the first thread group prior to encountering the disruption event.

13. The GPU of claim 9, wherein the disruption event is selected from the group consisting of exceptions generated by a first thread of the thread group and interrupts generated externally from the execution of the first thread group.

14. The GPU of claim 9, wherein the threads associated with each thread group executing within the multiprocessor concurrently execute, and the thread groups are allocated time slices in the multiprocessor.

15. The GPU of claim 9, further comprising a register file comprising the error status register, the program counter, a register for storing the memory address of the trap handler code segment, and a register for storing an identification of the first thread group.

16. A non-transitory computer-readable medium including trap handler instructions that, when executed by a multiprocessor of a parallel processing subsystem of a computer system, cause the multiprocessor to handle a disruption event occurring during execution of a first thread group within the multiprocessor by performing the steps of:

requesting a value of an error status register set by a trap handler controller to indicate a type of the disruption event;

branching to a sub-segment in the trap handler instructions that comprises instructions for addressing the type of disruption event;

identifying a second thread group that is waiting for at least one other thread group at a synchronization barrier instruction; and unwinding execution of the synchronization barrier instruction by the second thread group to facilitate entrance into the trap handler instructions for the second thread group; and executing instructions in the sub-segment in the trap handler instructions to handle the disruption event.

17. The computer-readable medium of claim 16, wherein prior to executing the trap handler instructions, the multiprocessor has received notification of the disruption event, halted execution of all thread groups executing within the multiprocessor, set the error status register to indicate the type of the disruption event; and set, for each thread group, a program counter to point to a memory address of a start of the trap handler instructions.

18. The computer-readable medium of claim 16, wherein upon completion of executing the instructions in the sub-segment in the trap handler instructions, the multiprocessor further performs the steps of:

waiting for each of the other thread groups executing in the multiprocessor to either complete execution within the trap handler instructions or yield execution flow to a host CPU residing within the computer system; and returning to a code segment of the current thread group prior to encountering the disruption event.

19. The computer readable medium of claim 16, wherein the step of executing instructions in the sub-segment of the trap handler instructions includes executing an instruction to transmit an interrupt to a host CPU residing within the computer system to notify the host CPU of the disruption event.

20. The computer readable medium of claim 16, wherein the disruption event is selected from the group consisting of exceptions generated by a first thread of the thread group and interrupts generated externally from the execution of the first thread group.

* * * * *